United States Patent [19]
Lalezari et al.

[11] Patent Number: 4,870,424
[45] Date of Patent: Sep. 26, 1989

[54] METHOD AND APPARATUS FOR REDUCING UNWANTED R.F. SIGNAL ANTENNA RECEPTION/TRANSMISSION

[75] Inventors: Farzin Lalezari; Taliaferro H. Taylor Jr., both of Boulder, Colo.

[73] Assignee: Ball Corporation, Muncie, Ind.

[21] Appl. No.: 436,437

[22] Filed: Oct. 25, 1982

[51] Int. Cl.$^4$ .............................................. G01S 3/16
[52] U.S. Cl. ..................................... 342/379; 342/17; 342/159
[58] Field of Search ............... 343/379, 398, 382, 709; 342/17, 159, 379, 382, 398

[56] References Cited

U.S. PATENT DOCUMENTS

| Re. 26,600 | 10/1969 | Rosen | 343/398 X |
|---|---|---|---|
| Re. 29,911 | 2/1979 | Munson | 343/700 |
| 2,297,395 | 9/1942 | Erben | 343/398 |
| 2,565,506 | 8/1951 | Litchford | 343/398 |
| 2,938,204 | 5/1960 | Adams et al. | 343/398 |
| 3,531,803 | 9/1970 | Rosen et al. | 343/374 X |
| 3,680,113 | 7/1972 | Dorier et al. | 343/374 |
| 3,721,950 | 3/1973 | Jorgensen et al. | 343/398 |
| 3,983,561 | 9/1976 | Biagi et al. | 343/348 X |
| 4,080,600 | 3/1978 | Toman | 343/398 |
| 4,257,048 | 3/1981 | Yokoi et al. | 343/709 |

Primary Examiner—Brian S. Steinberger
Attorney, Agent, or Firm—Gilbert E. Alberding

[57] ABSTRACT

A method and apparatus is disclosed for selectively modulating r.f. signals received/transmitted via the radiation pattern side lobes of an r.f. antenna structure. Such modulation permits discrimination between desired r.f. signal energy received via the primary radiation pattern lobe and unwanted r.f. radiation (e.g. noise, jamming or other interference signals) received/transmitted via the secondary or side lobe(s) of the radiation pattern.

16 Claims, 4 Drawing Sheets

METHOD AND APPARATUS FOR REDUCING UNWANTED R.F. SIGNAL ANTENNA RECEPTION/TRANSMISSION

SPECIFICATION

This invention relates generally to radio frequency reception/transmission antenna systems capable of selectively discriminating between spatially displaced locations of wanted and unwanted signal reception/transmissions.

It is well known in the prior art to design r.f. antenna structures with directive radiation patterns so as to enhance reception/transmission of r.f. energy in a preferred direction via the so-called principal or main lobe of the radiation pattern. For some antenna structures there may be more than one main or principal lobe. However, it is typical to design array apertures of plural radiator elements so as to define a principal radiation pattern lobe (which may be mechanically or electrically steered).

Unfortunately, as a practical matter, it is usually impossible to completely avoid secondary or side lobes in the radiation pattern which cause reception/transmission of r.f. energy from/to undesired directions. Various antenna array design techniques have been attempted to minimize such unwanted side lobe responses (e.g. adaptive array side lobe cancellers, etcetera). However, in general there usually remain some unwanted side lobe responses in the overall antenna radiation pattern structure.

We have now discovered new methods and apparatus which permit further advantageous reduction in unwanted r.f. signal components received/transmitted via the side lobes of an r.f. antenna structure.

In the presently preferred exemplary embodiments of this invention, while the main or primary lobe of the antenna radiation pattern structure remains oriented along the path of desired r.f. signal transmission/reception, the relative orientation of the radiation pattern side lobes with respect to the antenna structure surroundings is moved in a controlled way. For example, in one of the simplest embodiments, the side lobes are rotated or otherwise moved so as to minimize the signal component associated with the side lobe thereafter leaving a substantially static (i.e. non-moving in either a physical or electrical sense) antenna structure.

A more complicated exemplary embodiment of this invention causes the side lobe portion of the radiation pattern to undergo a continuous periodic motion. If the side lobe structure is asymmetric with respect to the periodic motion this will cause the r.f. signal components received/transmitted via the side lobes to be modulated and thus translated in the signal frequency spectrum away from the center frequency of operation for the antenna structure vis-a-vis signals associated with the main or primary radiation pattern lobe. The continuous periodic motion may be purely continuous rotational motion although other types of continuous periodic motions (dithering, jittering, etcetera) could also be used so as to periodically move the side lobe structure of the radiation pattern without substantially perturbing the orientation of the main lobe of the radiation pattern. The relative movement of the side lobe structure of the radiation pattern with respect to the surrounding environment of the antenna structure may be achieved by physical movement of at least a portion of the antenna structure (e.g. of an apertured radiation blocking structure overlying an array of radiator elements so as to thus define the effective array aperture) or by electrically changing the orientation of the array aperture (e.g. by beam steering techniques involving the selective electrical de-activation of predetermined radiator elements so as to achieve the same overall effect as the overlaid apertured radiation blocking element).

Once the r.f. signal components associated with the side lobe portion of the radiation pattern have thus been modulated, they may be distinguished or differentiated from the r.f. signal components associated with the main lobe of the radiation pattern in many different ways. For example, the periodic times at which the side lobe signals are at relatively higher levels may be detected and used to gate "off" the r.f. signals received/transmitted via the antenna structure by/from a connected r.f. signal receiver/transmitter apparatus during those times. Alternatively, a relatively narrow passband characteristic of the r.f. antenna structure itself and/or of the r.f. signal receiver/transmitter apparatus connected thereto may be utilized so as to effectively reject noise and/or interference signal components that would otherwise be received/transmitted via the side lobes of the radiation pattern.

In the latter situation where a narrow passband characteristic is utilized to discriminate translated side lobe r.f. signal components, it is conceivable that a purposeful signal jammer might try to offset the jamming signals from the antenna center frequency so as to cause the side lobe signal components to be effectively translated back into the passband of the antenna structure and/or the passband of the connected receiver/transmitter apparatus. To help insure against any such attempted neutralization of this technique, the rate at which the side lobe radiation pattern structure is moved may be varied so as to similarly vary the required offset of any successful jamming signal.

As should be apparent to those in the art, the above discussed movement of the side lobe structure of the radiation pattern may be achieved in discrete increments of movement as well as by continuous analog increments of movement or any desired combination thereof.

These as well as other objects and advantages of this invention will be better appreciated by careful study of the following detailed description of the presently preferred exemplary embodiments of this invention taken in conjunction with the accompanying drawings, of which:

Figure 1:
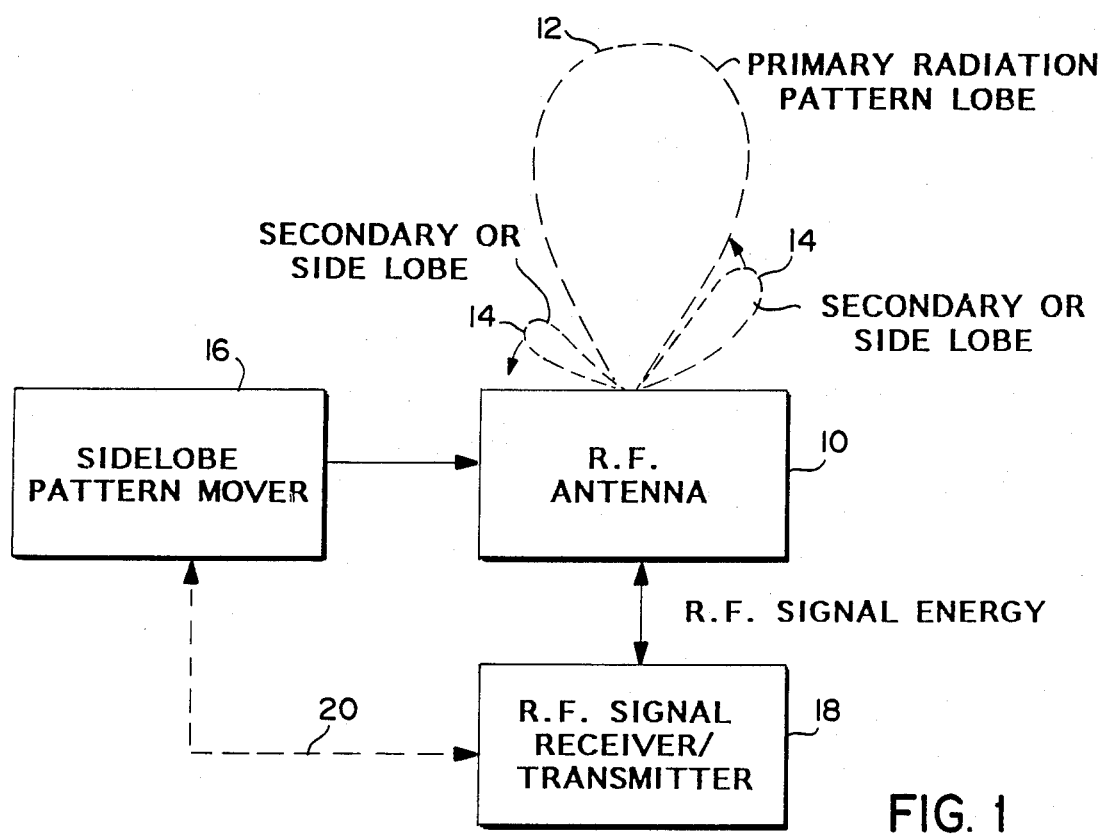
FIG. 1 is a generalized block diagram of an exemplary embodiment of this invention.

The r.f. antenna structure 10 shown in FIG. 1 typically has a primary or main radiation pattern lobe. The overall radiation pattern for the antenna structure 10 typically also includes at least one secondary or side lobe 14. This invention contemplates movement of the side lobe radiation pattern structure with respect to the surroundings of the antenna 10 by virtue of a side lobe pattern mover structure 16. As depicted in FIG. 1, the side lobe pattern mover structure 16 is operatively associated with the r.f. antenna structure 10 so as to produce the desired relative movement of the side lobe structure even though the primary or main radiation pattern lobe 12 remains oriented as desired. As also indicated in FIG. 1, an r.f. signal receiver/transmitter apparatus 18 is coupled to receive/transmit r.f. signal energy via the antenna structure 10. If desired, control signals may be communicated between the side lobe pattern mover 16 and the receiver/transmitter 18 as indicated at 20 in FIG. 1 (e.g. for synchronizing movement of the side lobe pattern with respect to receive/transmit functions, to vary the rate at which the side lobe pattern is moved in accordance with some exemplary embodiments of the invention, etcetera).

As will now be explained in greater detail, the method and apparatus of this invention permits one to distinguish or differentiate between r.f. signals received/transmitted within the main or primary radiation pattern lobe 12 (having a principal axis 12a) and those received/transmitted via the secondary or side lobe portions 14 of the radiation pattern. In a general nonlimiting example, this result is achieved by varying an unsymmetrical side lobe structure of the radiation pattern while maintaining the main beam lobe of the pattern relatively fixed in the desired direction of signal reception/transmission.

The ability to thus distinguish between desired signal components associated with the main or primary beam lobe of the radiation pattern and the undesirable signal components associated with the side lobe regions of the pattern, several advantages can be contemplated. For example, this permits one to effectively reduce, reject or eliminate unwanted signals associated with the side lobes thus greatly enhancing the ability to reject jamming, interference, and clutter/multipath signals, prevent unwanted detection of a transmitting station by acquisition of side lobe energy, to provide variable frequency separation of signals within and outside of the main antenna beam, etcetera. It also permits reduction in the transmitted/received side lobes by time averaging the energy transmitted/received via the side lobes over a greater volume or area. In both reception and transmission environments, it also permits one to locate the lowest side lobe response and then to leave the antenna radiation pattern statically positioned at that location (or thereafter moved as desired to maintain a minimum side lobe response). It should be noted that in this latter instance where the aperture may be simply rotated to a minimum side lobe signal in a desired direction, the antenna's polarization remains constant.

The more interesting embodiments of this invention, however, involve continuous periodic motion of the antenna aperture in such a way that the side lobe pattern varies with respect to the arrival direction of the unwanted signal. By way of nonlimiting example, such motion could be achieved by rotation, dither, jitter, or other partial or complete motion of the antenna structure aperture which results in effectively moving the side lobe structure of the antenna radiation pattern with respect to its surroundings without substantially perturbing the orientation of the main or primary lobe of the radiation pattern with respect to its surroundings. This desired motion of the antenna structure aperture may be achieved by physical movement (e.g. of a radiation blocking aperture plate or the like) or electrically (e.g. by electrically switching selected radiator elements in an array aperture) as depicted in FIG. 1.

As earlier mentioned, simply moving the side lobes with respect to the main lobe causes unwanted side lobe signals to be time averaged over the peaks and nulls in the side lobe portion of the radiation pattern. The net result of such time averaging is therefore an improvement (e.g. a reduction) in the average level of signals being transmitted/received via the side lobe structure of the radiation pattern.

Figure 2:
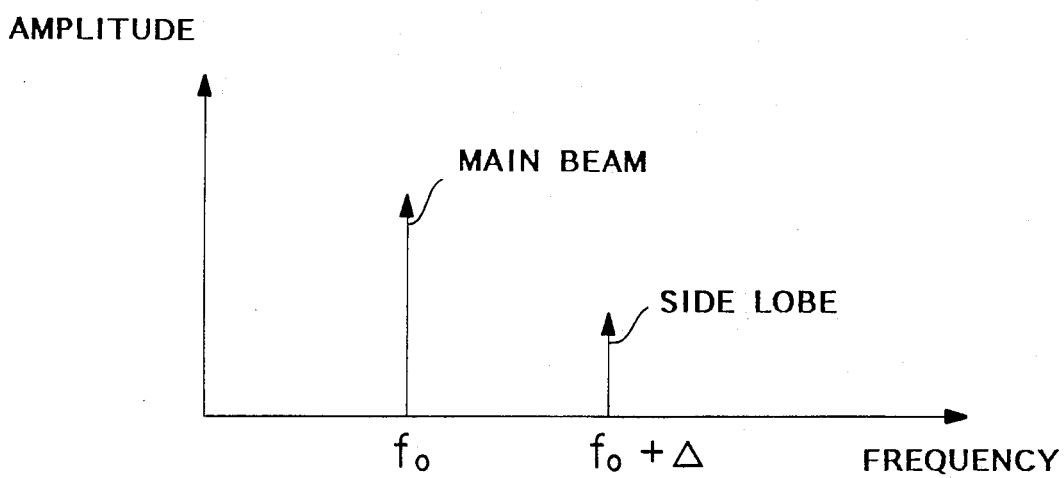
FIG. 2 is an exemplary frequency spectrum diagram useful in explaining one possible mode of operation for the system of FIG. 1.

However, as depicted in FIG. 2, continuous periodic motion of the side lobe structure with respect to the main lobe of the radiation pattern causes modulation of the signal component associated with the side lobes and thus causes that signal component to shift in the frequency domain. The frequency shifted side lobe signal (e.g. of a jammer or interferor) may then be rejected by frequency selective circuits of a signal processor (e.g. r.f. signal receiver 18 shown in FIG. 1) as an out-of-band signal component. If a "smart" interferor/jammer attempts to shift his jamming frequency so as to result in a signal component that is nevertheless within the signal processor's passband, the antenna structure can be designed so as to minimize this possibility by making it also possess a narrow passband frequency characteristic. For example, the antenna structure may comprise an array of microstrip radiator elements which are inherently relatively narrowband antenna elements. Such microstrip antenna elements are well known in the art as shown, for example, by U.S. Pat. No. Re 29,296 - Krutsinger et al and No. Re 29,911 - Munson and many other commonly assigned issued United States patents. Such narrowband antenna apertures will themselves reject the out-of-band frequency shifted jamming signals such that the side lobe modulation process does not frequency shift these signals into the signal processor passband.

Figure 4:
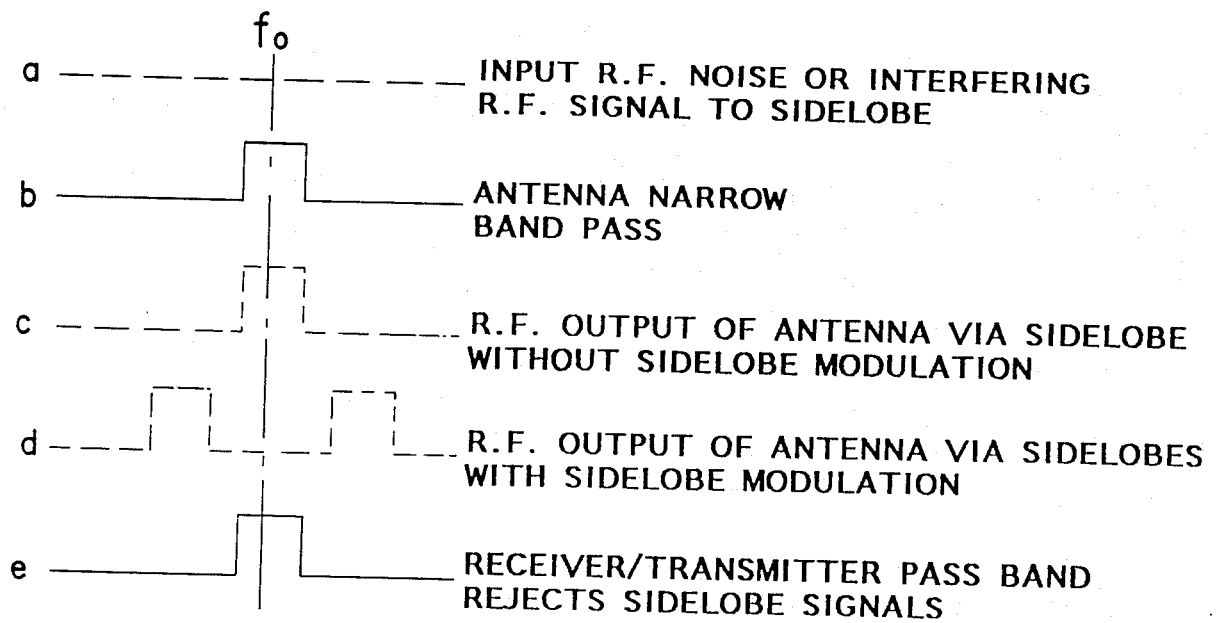
FIG. 4 is yet another frequency spectrum diagram useful in explaining another mode of operation for the system of FIG. 1.

FIG. 4 graphically depicts the frequency translation and rejection process associated with input r.f. noise or other unwanted interfering/jamming r.f. signals when an antenna aperture having a narrow bandpass about the desired signal frequency $f_0$ and the connected signal processor also has a narrow passband centered about that frequency. Thus, at line a in FIG. 4, a uniform level of unwanted input r.f. signal is assumed to the antenna aperture. However, as depicted at line b in FIG. 4, the antenna aperture itself is possessed of a narrow bandpass frequency characteristic such that only selected frequencies normally result in an antenna response as depicted in line c. When the unwanted signals received via the side lobe pattern structure are modulated as above described, then, due to the narrow passband frequency characteristic of the antenna aperture itself, the unwanted signal components associated with the side lobe are frequency translated above and below the antenna passband as shown in line d of FIG. 4. Thus, these frequency translated unwanted signal components will subsequently be rejected by the signal processor passband depicted in line e of FIG. 4. It should be particularly noted that an attempted jamming/interfering signal transmitted at $f_0 \pm \Delta$ in an attempt to get it side lobe modulated into the receiver passband at $f_0$ will also be rejected by the narrow passband of the antenna aperture.

Figure 3:
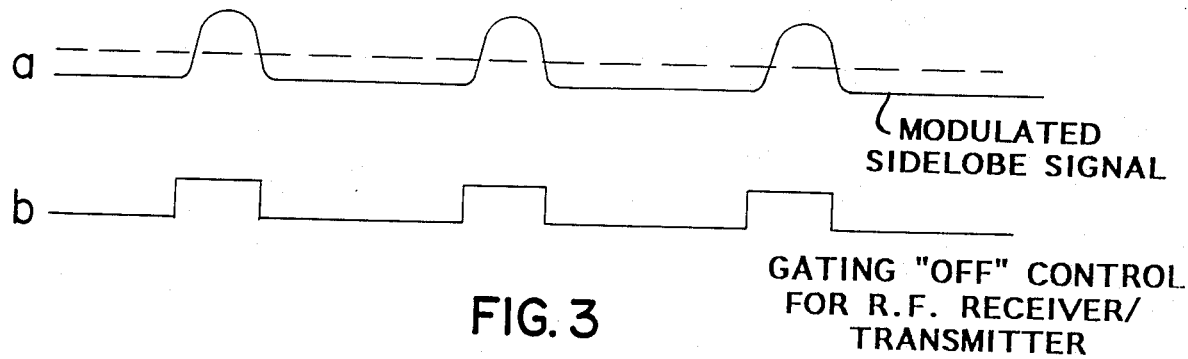
FIG. 3 is a signal timing diagram useful in explaining another possible mode of operation for the system of FIG. 1.

As depicted in FIG. 3, it may in some circumstances also be possible to threshold detect the received envelope of modulated side lobe signals so as to detect the time periods when these unwanted signals are at a peak. As should be appreciated by those in the art, the result of such threshold detection techniques (e.g. as depicted in FIG. 3) may be utilized to generate corresponding gating which permits the signal receiver to simply be turned "off" during the period when the unwanted modulated side lobe signals are above the selected threshold level.

The frequency shift associated with modulation of the side lobe is a function of the frequency at which the side lobe structure is caused to undergo periodic motion (e.g. rotation, dither, jitter, etcetera). Therefore, by rapidly moving the side lobe structure of the radiation pattern, the degree of frequency shift associated with the unwanted signal components may be made as large as necessary (of course within the limits of the particular motion technology employed).

As a further technique for foiling an attempted jammer/interferor, the frequency of side lobe modulation may be varied (e.g. randomly, periodically, etcetera) such that the frequency offset is also similarly varied and thus not easily determined by a potential jammer/interferor.

Figure 5:
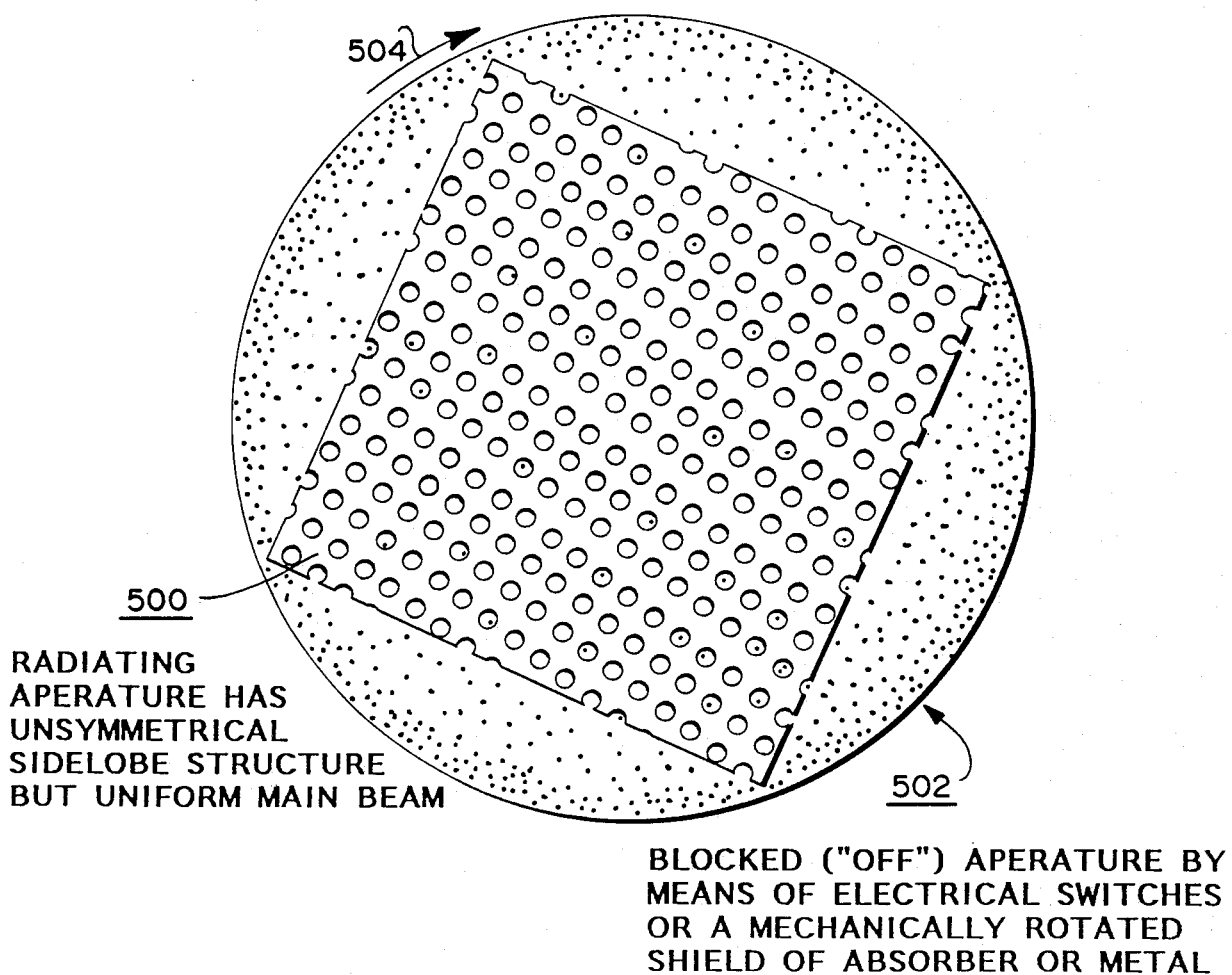
FIG. 5 is a top or plan view of an exemplary specific embodiment of the r.f. antenna structure and side lobe pattern mover structure shown in FIG. 1.

As should be understood by those in the art, there are many electrical and mechanical ways to modulate the side lobe structure of an antenna aperture radiation pattern. One such technique is depicted in FIG. 5. Here, a conventional array of microstrip antenna radiating elements 500 (e.g. thin conductive disks spaced less than one-tenth wavelength above a ground plane by a dielectric sheet and being shaped and fed so as to produce circularly polarized radiation) is overlaid by a radiation shield 502. The shield 502 may be rotated as indicated by the arrow 504 and includes a square shaped aperture as depicted through which radiation to/from the underlying array of microstrip radiators is permitted to pass. Thus, at any given point in time, the effective array aperture is determined by the square aperture in radiation shield 502. The shield itself may be formed of radiation absorbing material, metal, etcetera. Alternatively, the same effect could be achieved by selectively switching "off" the individual radiating elements that would otherwise be shielded at any given point in time by the shield 502. The resulting radiation aperture has an unsymmetrical side lobe radiation pattern structure which is caused to rotate with rotation of the shield 502. Nevertheless, the main or primary lobe of the radiation pattern remains substantially fixed in orientation.

Figure 6:
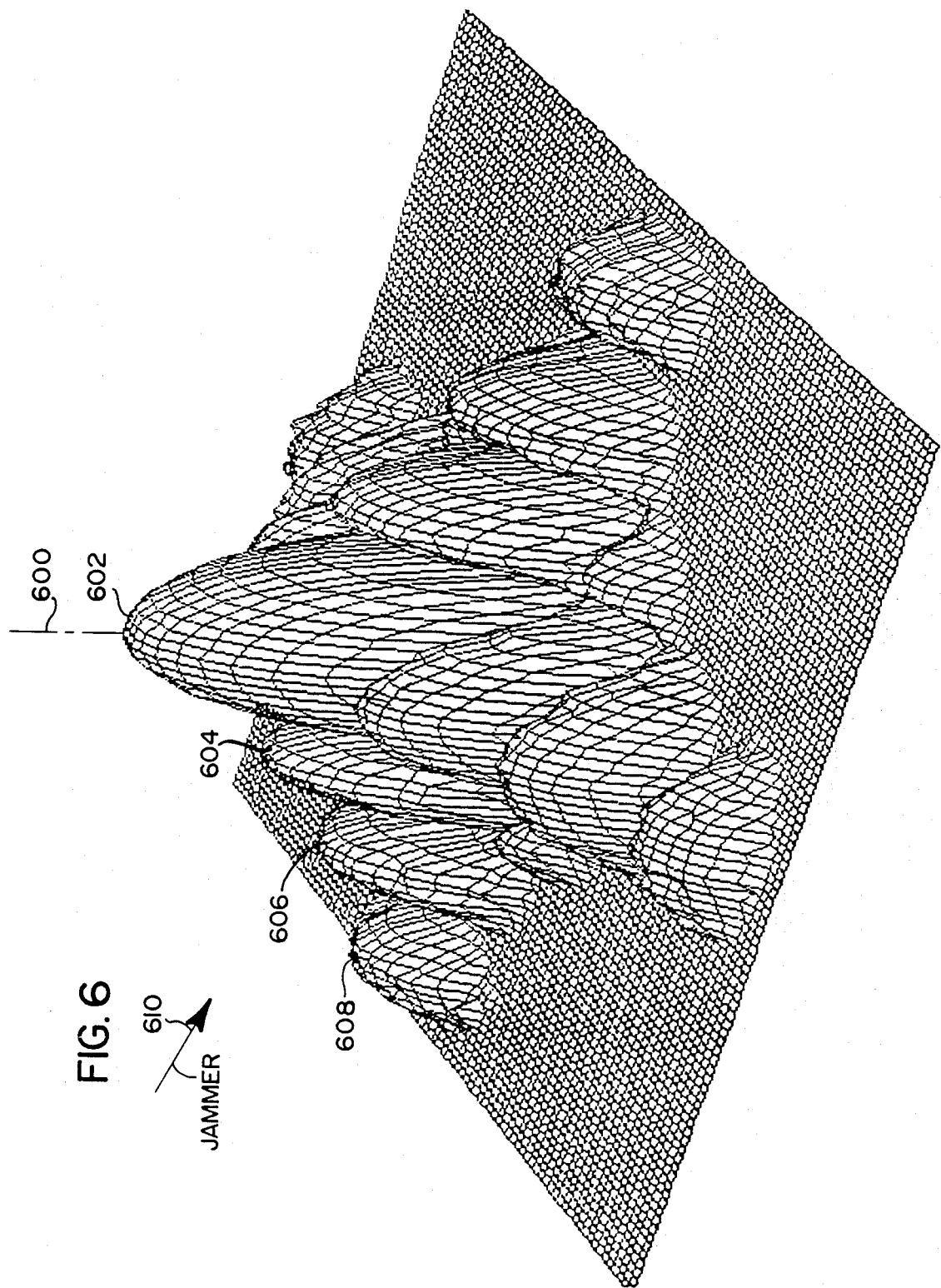
FIG. 6 is a three-dimensional visualization of a typical unsymmetrical radiation pattern side lobe structure of an r.f. antenna structure of the type to be used in the FIG. 1 embodiment.

FIG. 6 is a three-dimensional visualization of a typical unsymmetrical side lobe structure associated with a four-by-four element microstrip array that is uniformly illuminated. If one visualizes the three-dimensional radiation pattern depicted in FIG. 6 as rotating about the principal axis 600, then it will be seen that the principal lobe 602 will remain in substantially constant orientation with respect to its surroundings while the secondary side lobes (e.g. 604, 606 and 608) will rotate with respect to their surroundings and thus effectively modulate unwanted jamming or other signals incident on the antenna structure at another direction (e.g. 610 as shown in FIG. 6). Actually, if the FIG. 5 embodiment using an array with a large number of elements is utilized, the principal lobe may not even have to be considered as rotating since it is primarily defined by array elements never subject to periodic masking.

The side lobe modulation/unwanted signal reduction techniques discussed above may be applied to reception/transmission via reflectors (e.g. parabolic, circular, spherical, conical, etcetera whether cassegrain or primary feed) by rotation of the reflector or feed, to microwave horn structures of almost any type, and to antenna arrays of almost any type (e.g. planar, conformal, distributed, spherical, reflective and transmissive, etcetera). With respect to reflectors, horns, lenses, etcetera, a mesh, grid or apertured absorber may be overlaid (i.e. installed in front of) the reflector, signal feed, etcetera. Either electronic or mechanical spin, dither, etcetera motion may then be used with respect to the mesh, grid or apertured absorber so as to modulate the side lobe structure. The same technique may be used for overlaying an array of radiators as depicted, for example, above in FIG. 5. This technique is substantially independent of the pointing angle of the main beam where steerable arrays are involved. It may also be used with a frequency agile system. Where planar arrays are involved, the portion of the array which is controllably turned "on" or "off" to achieve the side lobe motion may be outside the main antenna aperture, similar to adaptive array side lobe cancellers.

It is believed that this invention provides a novel technique for reducing reception/transmission of unwanted r.f. signals via the side lobe portion of the radiation pattern. It is believed that this technique may require less complexity in technique and hardware than other state of the art techniques for reducing unwanted signals. There is no theoretical bandwidth limitation associated with our new technique. Furthermore, frequency agility using this technique does not necessarily require transmission of information between the antenna and processor thus permitting frequency agility to be made as rapidly as desired. Vehicle dynamics can be of little or no consequence when using this invention since the only primary requirement is that the jammer signal location be outside the main or primary beam lobe of the radiation pattern. Furthermore, the number or location of jammers/interferors or of other unwanted r.f. signals or noise is immaterial to most embodiments of this invention.

While only a few exemplary embodiments of this invention have been described in detail above, those ordinarily skilled in this art will appreciate that there are many possible modifications and variations which may be made in these exemplary embodiments while yet maintaining many of the novel and advantageous features of this invention. Accordingly, all such modifications and variations are intended to be included within the scope of the following claims.

What is claimed is:

1. A method of reducing r.f. signal reception/transmission via the radiation pattern side lobes of a two-dimensional r.f. antenna array structure having plural radiator elements and a radiating aperture of predetermined size and shape defined by a subset of said radiator elements and having a three-dimensional radiation pattern which includes a primary lobe with a principal axis extending away from said array and at least one secondary or side lobe which side lobe is not rotationally symmetric about the principal axis of the primary lobe, said method comprising the step of:

rotating the orientation of said radiation pattern about the principal axis of said primary lobe by rotating said aperture while maintaining constant its said predetermined size and shape but while also selecting different ones of said radiating elements to be within said subset or said radiator elements that is active for r.f. signal reception/transmission.

2. A method as in claim 1 wherein said rotating step is effected until minimum side lobe signal reception/transmission is achieved after which movement ceases.

3. A method as in claim 1 wherein said rotating step comprises continuous periodic motion.

4. A method as in claim 3 wherein said rotating step comprises continuous rotational motion.

5. A method as in claim 3 wherein said rotating step comprises a dithered motion.

6. A method as in claim 1, 3, 4 or 5 wherein said rotating step comprises physical movement of at least a portion of said antenna structure.

7. A method as in claim 3 further comprising the steps of:
   detecting the times at which r.f. signals received/transmitted via said side lobe are at relatively higher levels above a predetermined threshold level, and
   gating off r.f. signals received/transmitted via said antenna structure by/from connected r.f. signal receiver/transmitter apparatus during said periodic times.

8. A method as in claim 1 further comprising the step of using a narrowband microstrip r.f. antenna structure so as to better reject noise and interference signals otherwise received/transmitted via said side lobe.

9. A method as in claim 1, 3, 4 or 5 wherein said rotating step is performed at a varied rate of rotation so as to vary any frequency offset of the r.f. signal components received/transmitted via said side lobe.

10. A method as in claim 1 wherein said rotating step is performed in discrete increments.

11. A method as in claim 1 wherein rotating step is effected by selectively preventing signal reception/transmission by some of said radiator elements.

12. Apparatus for reducing unwanted r.f. signal reception/transmission via an r.f. antenna structure, said apparatus comprising:
   a two-dimensional antenna array structure including a plural radiators and a radiating aperture of predetermined size and shape defined by a subset of said radiators and having a radiation pattern which includes a primary lobe and at least one secondary lobe or side lobe, and
   pattern modification means associated with said antenna structure for causing said secondary lobe to be rotated relative primary lobe whereby r.f. signals received/transmitted via the secondary lobe are modulated and made distinguishable from those received/transmitted via the primary lobe by rotating said radiating aperture while maintaining constant said predetermined size and shape but while also selecting different ones of said radiators to be within said subsets that is active for r.f. signal reception/transmission.

13. Apparatus as in claim 12 wherein said secondary lobe is asymmetrical with respect to the rotational movement.

14. Apparatus as in claim 12 wherein said antenna structure comprises an array aperture of narrowband microstrip radiator elements and said pattern modification means comprises an overlayed rotatable aperture capable of selectively preventing r.f. signal reception/transmission from some of the radiator elements as rotation occurs.

15. Apparatus as in claim 14 wherein said overlayed rotatable aperture comprises a physical structure capable of blocking r.f. signal passage therethrough except for an apertured portion thereof.

16. Apparatus as in claim 14 wherein said overlayed rotatable aperture comprises electrically switchable means connected to selectively electrically disable predetermined ones of said radiator elements.

* * * * *